United States Patent
Gutel et al.

(10) Patent No.: US 9,640,797 B2
(45) Date of Patent: May 2, 2017

(54) POLYMER SERVING AS AN ELECTRODE MATERIAL FOR LITHIUM SECONDARY BATTERIES

(71) Applicant: COMMISSARIAT A L'ENERGIE ATOMIQUE ET AUX ENERGIES ALTERNATIVES, Paris (FR)

(72) Inventors: Thibaut Gutel, Montsoult (FR); Yann Kervella, Saint Verand (FR); Lionel Picard, La Tour du Pin (FR); Jean-Benoit Denis, Saint Martin au Laert (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/394,963

(22) PCT Filed: Apr. 10, 2013

(86) PCT No.: PCT/IB2013/052839
§ 371 (c)(1),
(2) Date: Oct. 16, 2014

(87) PCT Pub. No.: WO2013/156899
PCT Pub. Date: Oct. 24, 2013

(65) Prior Publication Data
US 2015/0108413 A1    Apr. 23, 2015

(30) Foreign Application Priority Data

Apr. 16, 2012    (FR) ...................................... 12 53488

(51) Int. Cl.
*H01M 4/60* (2006.01)
*H01M 4/04* (2006.01)
(Continued)

(52) U.S. Cl.
CPC ............ *H01M 4/602* (2013.01); *C08G 61/02* (2013.01); *H01G 11/30* (2013.01); *H01G 11/48* (2013.01);
(Continued)

(58) Field of Classification Search
CPC .. H01M 4/602; H01M 4/0485; H01M 4/0402; H01M 10/0525; H01M 12/08;
(Continued)

(56) References Cited

U.S. PATENT DOCUMENTS

| 5,107,308 A | * | 4/1992 | Koezuka | ............. H01L 51/0035 257/289 |
| 7,651,647 B1 | | 1/2010 | Strange et al. | ............... 264/104 |

(Continued)

FOREIGN PATENT DOCUMENTS

| EP | 1 244 168 | | 9/2002 | | |
| JP | 2002304996 A | * | 10/2002 | ............ | H01M 4/137 |

(Continued)

OTHER PUBLICATIONS

Machine translation of JP 2011146346.*
(Continued)

*Primary Examiner* — Peter F Godenschwager
*Assistant Examiner* — Andrew J Oyer
(74) *Attorney, Agent, or Firm* — Norton Rose Fulbright US LLP

(57) ABSTRACT

The present invention relates to a polymer possessing a linear backbone selected from the homopolymers belonging to the family of polyfluorenes, polycarbazoles, polyanilines, polyphenylenes, polyisothionaphthenes, polyacetylenes, polyphenylene vinylenes, and copolymers thereof, said backbone bearing at least one side group possessing at least one nitroxide function.

(Continued)

Figure 1:
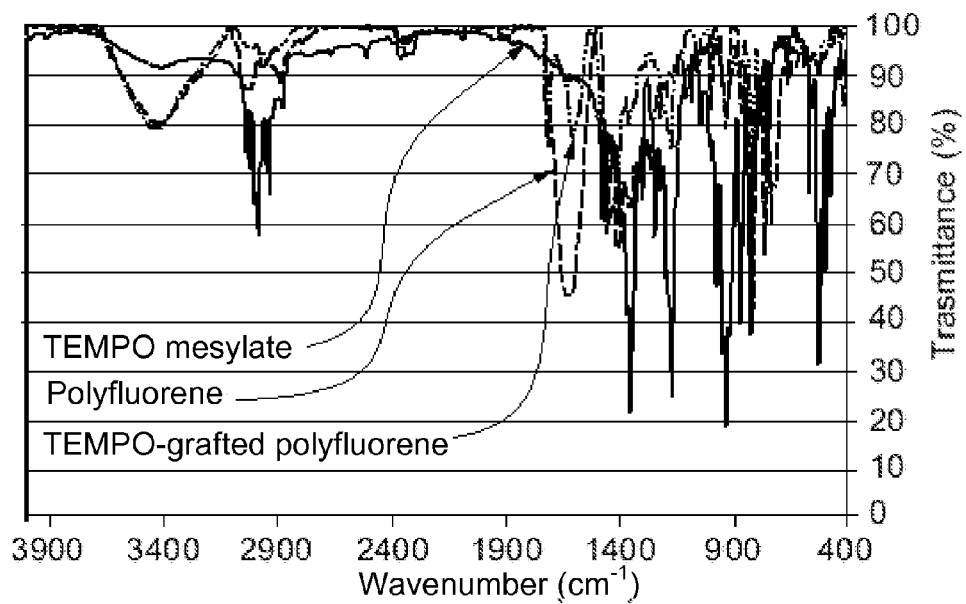

It also relates to an electrode material, an electrode and a lithium secondary battery obtained from such a polymer.

15 Claims, 1 Drawing Sheet

(51) Int. Cl.
| | |
|---|---|
| *H01M 10/0525* | (2010.01) |
| *H01M 12/08* | (2006.01) |
| *H01G 11/48* | (2013.01) |
| *H01G 11/30* | (2013.01) |
| *C08G 61/02* | (2006.01) |
| *H01M 10/052* | (2010.01) |
| *H01M 4/137* | (2010.01) |
| *H01M 4/1399* | (2010.01) |

(52) U.S. Cl.
CPC ....... *H01M 4/0402* (2013.01); *H01M 4/0466* (2013.01); *H01M 4/0485* (2013.01); *H01M 4/137* (2013.01); *H01M 4/1399* (2013.01); *H01M 4/604* (2013.01); *H01M 4/606* (2013.01); *H01M 4/608* (2013.01); *H01M 10/052* (2013.01); *H01M 10/0525* (2013.01); *H01M 12/08* (2013.01); *C08G 2261/143* (2013.01); *C08G 2261/3142* (2013.01); *C08G 2261/412* (2013.01); *C08G 2261/90* (2013.01); *H01M 2220/20* (2013.01); *H01M 2220/30* (2013.01); *Y02E 60/13* (2013.01); *Y02T 10/7011* (2013.01); *Y02T 10/7022* (2013.01)

(58) Field of Classification Search
CPC .. H01M 4/137; H01M 4/0466; H01M 10/052; H01M 4/604; H01M 4/608; H01M 4/606; H01M 4/1399; H01M 2220/30; H01G 11/48; H01G 11/30; C08G 61/02; Y02T 10/7022

See application file for complete search history.

(56) References Cited

U.S. PATENT DOCUMENTS

| | | | |
|---|---|---|---|
| 2001/0024738 A1 | 9/2001 | Hawker et al. | 33/12 |
| 2003/0096165 A1* | 5/2003 | Nakahara | H01M 4/13 |
| | | | 429/213 |
| 2004/0115529 A1 | 6/2004 | Nakahara et al. | |
| 2010/0255372 A1* | 10/2010 | Suguro | H01M 4/602 |
| | | | 429/213 |
| 2011/0229759 A1* | 9/2011 | Yazami | H01M 4/0402 |
| | | | 429/213 |
| 2012/0295166 A1* | 11/2012 | Gennett | B82Y 30/00 |
| | | | 429/314 |

FOREIGN PATENT DOCUMENTS

| | | | |
|---|---|---|---|
| JP | 2010-1802854 | | 9/2004 |
| JP | 2005008689 A | * | 1/2005 |
| JP | 2008-192452 | | 8/2008 |
| JP | 2008-282632 | | 11/2008 |
| JP | 2009238489 A | * | 10/2009 |
| JP | 2011146346 | * | 7/2011 |
| WO | WO 2009/043729 | | 4/2009 |
| WO | WO 2009/127674 | | 10/2009 |

OTHER PUBLICATIONS

Miura, Y., and Ushitani, Y. Synthesis and Characterization of Poly(1,3-phenyleneethynylene) with Pendant Nitroxide Radicals, Macromolecules 1993, 26, 7079-7082.*
Machine translation of JP2005008689.
Machine translation of JP2009238489.

* cited by examiner

POLYMER SERVING AS AN ELECTRODE MATERIAL FOR LITHIUM SECONDARY BATTERIES

CROSS-REFERENCE TO RELATED APPLICATIONS

This application is a national phase application under 35 U.S.C. §371 of International Application No. PCT/IB2013/052839 filed 10 Apr. 2013, which claims priority to French patent application No. 1253488 filed 16 Apr. 2012. The entire contents of each of the above-referenced disclosures is specifically incorporated herein by reference without disclaimer.

The present invention relates to the field of lithium secondary batteries. One subject of the invention is more particularly the use of novel electron-conducting polymers as active material of electrodes for secondary lithium batteries, in particular for lithium-ion batteries.

Lithium batteries are increasingly used as autonomous energy sources, in particular in portable equipment, where they are gradually replacing nickel-cadmium (NiCd) and nickel-metal hydride (NiMH) storage batteries. This change is explained by the continuous improvement in the performances of lithium storage batteries, thus giving them energy densities that are significantly higher than those proposed by the NiCd and NiMH systems. Lithium batteries find multiple applications, especially in new information and communication technologies (NICT), medical devices, electric vehicles, the storage of energy from photovoltaic cells, etc.

These lithium electrochemical generators operate conventionally on the principle of lithium insertion or extraction (or intercalation-deintercalation) on at least one electrode. In particular, in a lithium-ion storage battery, the $Li^+$ cations thus move back and forth between the respectively positive and negative electrodes, on each charging and discharging of the storage battery. The active material of the positive electrode is capable of releasing lithium ions at the time of charging and of incorporating lithium ions at the time of discharging.

Generally, the electrode active compounds used in commercial storage batteries are, for the positive electrode, lamellar compounds such as $LiCoO_2$, $LiNiO_2$ and mixed compounds $Li(Ni, Co, Mn, Al)O_2$ or compounds of spinel structure having compositions close to $LiMn_2O_4$. The negative electrode is generally carbon (graphite, coke, etc.) or optionally the spinel $Li_4Ti_5O_{12}$ or a metal that forms an alloy with lithium (Sn, Si, etc.).

In order to respond more particularly to the new hybrid and electric motor vehicle or photovoltaic solar markets, the constraints in terms of cost, production volume and power performances necessitate the search for novel electrode active materials.

From this point of view, polymers have already been proposed, for example in documents WO 2009/043729, WO 2009/127674 or EP 1 244 168, as active materials, for their property of conducting electricity, as a replacement for or in addition to conventional electron conductors such as carbon black. They are mainly used for their ease of processing, compared to suspensions of conductive particles, and make it possible to improve the electrical percolation of the electrode active materials.

The polymers most commonly used are polyanilines, polypyrroles, polymers that have on their chain a component that bears a disulfide bridge, or else proton-conducting compounds that contain at least one heterocycle with a nitrogen atom. These active materials are mainly used for primary lithium-ion batteries, i.e. non-rechargeable batteries.

By way of example, document U.S. Pat. No. 7,651,647 proposes the use of a mixture of an active material such as silver vanadium oxide or fluorinated carbon and a conductive polymer selected from polyaniline, polydioxythiophene and combination thereof, for the manufacture of a positive electrode of an electrochemical cell.

Furthermore, within the context of active materials used for secondary lithium batteries, the preparation of polymethyl methacrylate polymers grafted by nitroxide functions such as 2,2,6,6-tetramethylpiperidinyl-N-oxy (TEMPO) groups is described in document JP 2010-1802854.

Mention may also be made of document JP 2008-192452 which describes the use, as electrode active materials, of conductive polymers formed from monomers having five-membered heteroaromatic rings, in particular polythiophenes bearing TEMPO radicals or derivatives. These polymers are synthesized by grafting of the TEMPO unit to the monomers, followed by polymerization.

However, the use of these grafted polymers in secondary lithium batteries requires the combined use of large amounts of conventional electron conductors, such as carbon black, generally between 20% and 70% by weight, in order to enable the extraction of electrons from the active material. The addition of such amounts of electron conductors takes place at the expense of the energy density by mass or volume of the electrode, and makes any industrial application very expensive. Furthermore, the use of additional binders is necessary to ensure the adhesion of the polymer material to the current collector and a good mechanical strength of the electrode. Finally, in general, these grafted polymers are formed by grafting nitroxide functions to the monomers, prior to the polymerization, which makes the reaction steps difficult and results in poor yields.

The present invention aims to propose novel polymers that can be used as electrode material for secondary lithium batteries, and that make it possible in particular to overcome the aforementioned drawbacks.

More particularly, it relates, according to a first of its aspects, to a polymer possessing a linear backbone selected from the homopolymers belonging to the family of polyfluorenes, polycarbazoles, polyanilines, polyphenylenes, polyisothionaphthenes, polyacetylenes, polyphenylene vinylenes, and copolymers thereof, said backbone bearing at least one side group possessing at least one nitroxide function.

Within the meaning of the present invention, the term "side" signifies that said group is positioned so as to represent a pendant group or else "a graft" on the linear backbone. In the remainder of the text, mention will be made either of "side group" or "graft". The polymers of the invention having said side groups are subsequently denoted by either the expression "polymers grafted" or "polymers functionalized" by said groups. Unless otherwise indicated, mention will more simply be made of "side groups" or "graft" for denoting the side groups having at least one nitroxide function.

Such electron-conducting graft polymers prove particularly advantageous as the active material of electrodes for secondary lithium batteries, the grafted nitroxide functions ensuring the reversible complexation of the $Li^+$ ions.

The expression "nitroxide function" is understood to denote the NO. radical form.

Thus, the invention also relates, according to another of its aspects, to the use of such polymers as electrode material. It further relates to such an electrode material and to the electrode thus formed.

The use of graft polymers according to the invention as electrode material proves advantageous on several fronts.

Firstly, the electrodes formed according to the invention may be used for the production of lithium batteries having very short charging and recharging times (of the order of 1 to 10 minutes), and could therefore advantageously be used for obtaining a high current in a short time.

Furthermore, they have a good flexibility and lightness, properties that are particularly desired in the context of the use of electrodes in portable systems.

Moreover, the use of the polymers of the invention for forming effective electrodes in secondary lithium battery devices does not require the use of additional electron conductors and therefore makes it possible to reduce the amount of such additional electron conductors, or even to do away with them completely.

Also, advantageously, the polymers of the invention may act both as charge extractors toward the current collector of the electrode, but also as binders. In fact, the use of the polymers according to the invention makes it possible to reduce the amount of additional binders to be introduced, or even to completely do away with the use of such additional binders.

Finally, as expanded upon subsequently, it is possible to prepare the graft polymers of the invention by grafting groups bearing one or more nitroxide functions directly to the un-functionalized polymers already formed. This preparation method is particularly advantageous, compared to the process normally used in which the grafting is carried out on the monomers before polymerization, and leads to improved reaction yields, which makes it possible to optimize the process for preparing the electrode material and therefore the steps of manufacturing the resulting electrodes and electrochemical cells.

Other features, variants and advantages of the polymers according to the invention, of the preparation thereof and of the use thereof will emerge more clearly on reading the description, examples and figures that will follow, given by way of illustration and with no implied limitation of the invention.

In the remainder of the text, the expressions "between . . . and . . . ", "ranging from . . . to . . . " and "varying from . . . to . . . " are equivalent and are understood to mean that the limits are included, unless otherwise mentioned.

Unless otherwise indicated, the expression "having/comprising a(n)" should be understood to mean "having/comprising at least one".

Polymer

As specified above, the polymers according to the invention possess a linear backbone selected from the homopolymers belonging to the family of polyfluorenes, polycarbazoles, polyanilines, polyphenylenes, polyisothionaphthenes, polyacetylenes, polyphenylene vinylenes, and copolymers thereof.

According to one particularly preferred embodiment, said linear backbone is selected from the homopolymers belonging to the family of polyfluorenes and polycarbazoles, and copolymers thereof.

It may in particular be a linear backbone formed completely or partly from a polyfluorene.

According to one particular embodiment, the polymers of the invention have a linear backbone formed from a polyfluorene.

According to one essential feature of the invention, the polymers of the invention have side groups, also referred to as grafts, possessing at least one nitroxide (NO) function.

According to one particular embodiment, the polymers according to the invention have an electroactivity potential that is compatible with the redox potential of the nitroxide function. The expression "electroactivity potential" of the polymer is understood to mean the potential at which the doping reaction corresponding to the creation of a negative charge for n doping or a positive charge for p doping, delocalized over several monomer units, takes place. This reaction is reversible (possibility of dedoping) and greatly improves the electron conductivity of the polymer.

The side groups bearing at least one nitroxide function may have one of the following structures (G1) to (G8):

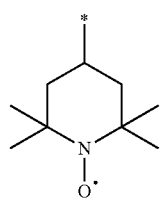

(G1)

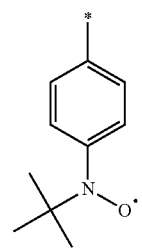

(G2)

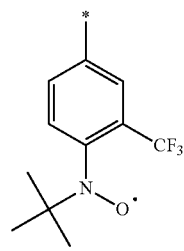

(G3)

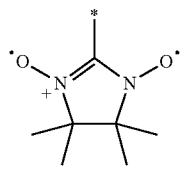

(G4)

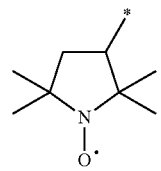

(G5)

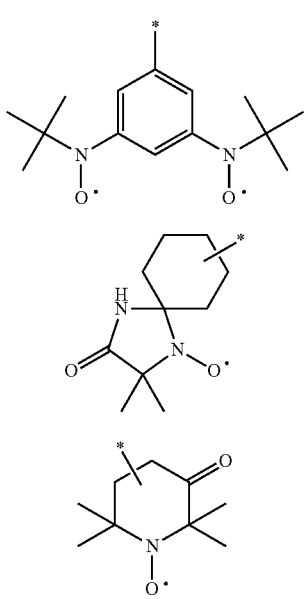

with * depicting the location of the site of bonding to said linear backbone.

The grafts borne by a polymer according to the invention may be identical or different.

According to one particular embodiment, at least one portion, or even all, of said side groups possess at least two nitroxide functions, in particular possess two nitroxide functions.

They may be, for example, grafts having the aforementioned structures (G4) and (G6).

A person skilled in the art is capable of choosing the nature of the grafts to be used, especially with regard to the number of nitroxide functions per graft, in order to obtain the desired molar degree of grafting of nitroxide functions of said polymer.

Preferably, the polymers according to the invention have a molar degree of grafting of nitroxide functions ranging from 1% to 800%, preferably from 50% to 200%.

According to another particular embodiment, at least one portion, or even all, of said side groups has the structure 2,2,6,6-tetramethylpiperidinyl-N-oxy, (structure (G1) represented above), also referred to as TEMPO.

According to one particularly preferred embodiment, the polymers according to the invention have the general structure (I) below:

$$\text{A} + (Z_1)_m \left[ \text{fluorene with } R_1, R_2 \right]_n (Z_2)_p + \text{B} \quad (I)$$

wherein:
A and B represent, independently of one another, a hydrogen atom, a halogen atom, in particular bromine, an acetylenic (for example ethynyl) function, a boronic acid (—B(OH)$_2$) or borane (for example pinacolborane (—B(O$_2$C$_2$H$_4$))) function, a stannic function (for example —SnR$_3$, with R representing an alkyl), a zincic group (for example —ZnX with X being a halogen) or a magnesian group (for example —MgX with X being a halogen atom);

—(Z$_1$)$_m$— and —(Z$_2$)$_p$— represent the sequence of one or more monomers selected from carbazole, aniline, phenylene, isothionaphthene, acetylene and phenylene vinylene monomers; —(Z$_1$)$_m$— being at position 5, 6, 7 or 8 of the fluorene, —(Z$_2$)$_p$— being at position 1, 2, 3 or 4 of the fluorene;

at least one of R$_1$ and R$_2$ represents *—Y(G)$_t$, with:
* representing a covalent bond with the fluorene; t being equal to 1 or 2;
if t is equal to 1, Y represents a covalent bond; a linear or branched, saturated or unsaturated (C$_1$-C$_5$)alkyl group, optionally interrupted by one or more heteroatom(s) such as S, O or N or by one or more ether, ester or amide functions; —O—; —COO— or —CONH;
if t is equal to 2, Y represents a linear or branched, saturated or unsaturated (C$_1$-C$_5$)alkyl group, optionally interrupted by one or more heteroatom(s) such as S, O or N or by one or more ether, ester or amide functions; —O—; —COO— or —CONH;
G representing a group possessing at least one nitroxide function, in particular selected from the structures (G1) to (G8) as defined above;
the other one of R$_1$ and R$_2$ represents *—Y(G)$_t$, which may be identical or different, or a hydrogen atom;
m and p represent integers ranging from 0 to 50000; and
n represents an integer ranging from 1 to 50000, on condition that when n=1, at least one of m and p is other than 0.

According to one particular embodiment, R$_1$ represents a *—Y(G)$_t$ group with t being equal to 1, Y representing a covalent bond, and G being selected from the structures (G1) to (G8) defined above, in particular representing a TEMPO group (structure (G1)).

More particularly, the polymers of the invention may be polyfluorenes bearing side groups that possess at least one nitroxide function.

Preferably, they correspond to the aforementioned formula (I) in which A and B represent, independently of one another, a hydrogen atom or a halogen atom, in particular bromine; R$_1$ represents a *—Y(G)$_t$ group with t being equal to 1, Y representing a covalent bond, and G being selected from the structures (G1) to (G8) as defined above, in particular (G1); R$_2$ represents H; m and p are equal to 0 and n is an integer ranging from 2 to 50000.

Such polymers may more particularly have a degree of polymerization ranging from 5 to 5000, preferably from 10 to 100.

As examples of polyfluorenes in accordance with the invention, mention may more particularly be made of the polymers of formula (I') below:

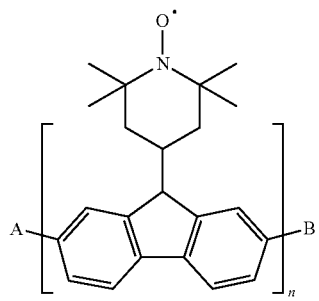

wherein A and B are as defined above, and n ranges from 5 to 5000, preferably from 10 to 100.

According to one particular embodiment, the polymers of the invention may be crosslinked.

The expression "crosslinked polymers" is understood for the purposes of the invention to mean polymers resulting from the use, during the polymerization, of a crosslinking or branching agent, that is to say an agent that has several polymerizable functions, preferably that is bifunctionalized.

According to yet another particular embodiment, the polymers of the invention may comprise, beside said side groups possessing one or more nitroxide functions, one or more additional side groups, such as for example linear or branched, saturated or unsaturated ($C_1$-$C_5$)alkyl groups, optionally interrupted by one or more heteroatom(s) such as S, O or N or by one or more ether, ester or amide functions; —O—; —COO— or —CONH.

Processes for Preparing the Polymers of the Invention

The polymers according to the invention may be prepared according to two alternative routes:
  formation of the polymer prior to the grafting of said side groups; or
  functionalization of the monomers by said side groups, prior to the formation of the polymer by polymerization of said functionalized monomers.

More specifically, according to a first particularly preferred embodiment variant, the polymers according to the invention may be prepared according to a process comprising at least the steps consisting of:
  (a) providing a polymer selected from the homopolymers belonging to the family of polyfluorenes, polycarbazoles, polyanilines, polyphenylenes, polyisothionaphthenes, polyacetylenes, polyphenylene vinylenes, and copolymers thereof; and
  (b) bringing said polymer into contact with an entity possessing at least one nitroxide function, under conditions conducive to the interaction thereof and to the formation of the expected functionalized polymer.

This first variant is illustrated in examples 3 or 4 (polymerization of unfunctionalized monomers) and in example 5.

The polymer of step (a) may be prepared, prior to its use in the process of the invention, according to polymerization methods known to a person skilled in the art.

Quite unexpectedly, the inventors discovered that it was possible to obtain the functionalized polymers according to this first synthesis route, with high synthesis yields.

Such a process is all the more surprising since it is generally feared that the grafting sites on polymers already formed may not be accessible for carrying out suitable grafting.

By way of example, the polymers of structure (I) as defined above may be prepared according to a process that comprises bringing a polymer having the structure (II) below:

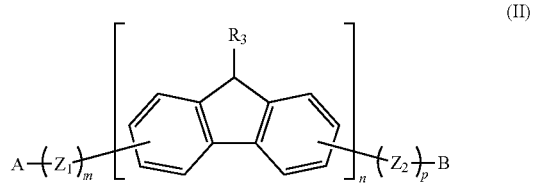
(II)

wherein A, B, $Z_1$, $Z_2$, m, n and p are as defined above;

into contact with at least one compound of formula X—Y(G)$_t$, wherein Y, G and t are as defined in claim 8 or 9; and
  either X represents a leaving group, in particular a halogen function, or a mesylate or tosylate group; and $R_3$ represents H;
  or X and $R_3$ represent groups capable of interacting together, in the presence of a transition metal catalyst, according to a coupling reaction, in order to form a C—C bond;
under conditions conducive to obtaining the structure (I) as defined above.

For example, the polymers of formula (I') defined above may more particularly be prepared by grafting of compounds of formula:

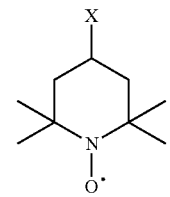

wherein X represents a leaving group, in particular a halogen function, or a mesylate or tosylate group;
to a polyfluorene of formula (II'):

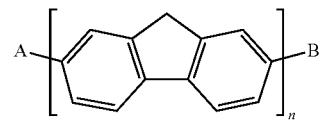

wherein A, B and n are as defined above.

According to one particular variant of the process of the invention, the grafting of the groups according to the invention to said polymer may be carried out via a coupling reaction between said substituents $R_3$ and X in order to lead to the formation of a C—C bond, in the presence of a transition metal type catalyst.

More particularly, one of the substituents X and $R_3$ may represent a halogen atom, the other one of X and $R_3$ representing a borane, boric acid, stannic or zincic function, said coupling reaction being catalysed by a palladium complex.

According to one particular embodiment, one of X and $R_3$ represents a halogen, the other one representing a borane or boric acid function, the coupling reaction being carried out in the presence of a palladium complex (reaction known under the name "Suzuki coupling").

According to another particular embodiment, one of X and $R_3$ represents a halogen, the other one representing a stannic function, the coupling reaction being carried out in the presence of a palladium complex (reaction known under the name "Stille coupling").

According to yet another particular embodiment, one of X and $R_3$ represents a halogen, the other one representing a zincic function, the coupling reaction being carried out in the presence of a palladium complex (reaction known under the name "Negishi coupling").

According to another particular embodiment, the polymers according to the invention may be prepared according to a process comprising at least the steps consisting of:

(c) providing monomers bearing at least one group possessing at least one nitroxide function, said monomers being selected from the family of fluorenes, carbazoles, anilines, phenylenes, isothionaphthenes, acetylenes and phenylene vinylenes and mixtures thereof; and (d) (co)polymerizing said monomers in order to obtain said expected functionalized polymer.

The monomers of step (c) may be prepared first by grafting methods known to a person skilled in the art, as illustrated in example 2.

This second process variant is illustrated in example 2 and examples 3 or 4 (polymerization of previously functionalized monomers).

In particular, the polymers of structure (I) as defined above may be prepared by polymerization of monomers of formula (III) below:

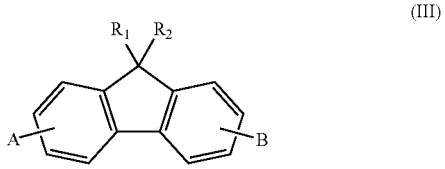

(III)

wherein $R_1$, $R_2$, A and B are as defined above, A being at position 5, 6, 7 or 8 of the fluorene, B being at position 1, 2, 3 or 4 of the polyfluorene in order to form a polymer of structure (I) as defined above.

By way of example, the polymers of formula (I') defined above may be prepared by polymerization of monomers of formula (III'):

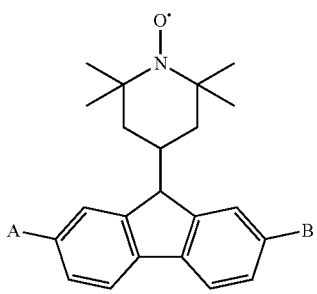

wherein A and B are as defined above.

Of course, it is up to a person skilled in the art to adjust the synthesis conditions in order to obtain the graft polymers according to the invention.

Electrode

As specified above, the polymer according to the invention may be used as an electrode active material.

According to another of its aspects, the invention thus relates to an electrode active material comprising at least one polymer as defined above.

The electrode material may be prepared in the form of a powder.

The electrode material may comprise a polymer or a blend of polymers according to the invention. It may comprise, besides said polymer(s) of the invention, one or more additional compounds conventionally used, such as for example a binder or a conductive additive.

According to yet another of its aspects, the invention relates to an electrode comprising an electrode material as described above.

Preferably, the electrode material represents from 5% to 100% by weight of the total weight of the electrode, in particular more than 70% by weight, and more particularly from 80% to 100% by weight of the total weight of said electrode.

An electrode according to the invention may be used as a positive electrode or as a negative electrode, in particular of a lithium generator.

Conventionally, an electrode according to the invention may comprise a current collector to which said electrode active material is applied, for example via the techniques expanded upon below.

For example, aluminum or stainless steel may be used as current collector for a positive electrode; and copper, nickel or steel, processed as a cut foil, a foamed metal or a sheet of rolled foil, for example, may be used as current collector for a negative electrode.

According to one particular embodiment, the electrode may additionally comprise one or more electron-conducting additives and/or one or more binders.

Said electron-conducting additive(s) may be selected from carbon fibres, carbon black, carbon nanotubes and analogues thereof.

According to one preferred embodiment, said electron-conducting additive(s) may be present in an amount of less than or equal to 20% by weight relative to the total weight of said electrode, preferably less than or equal to 10% by weight, and more particularly less than or equal to 5% by weight, relative to the total weight of said electrode.

Preferably, the electrode may be free of electron-conducting additive.

According to another particular embodiment, the electrode may additionally comprise one or more binders.

Such binder(s) may be selected from fluorinated binders, in particular from polytetrafluoroethylene, polyvinylidene fluoride, polysaccharides and latices, especially of styrene-butadiene rubber (SBR) type.

According to one preferred embodiment, said binder(s) may be present in an amount of less than or equal to 50% by weight, relative to the total weight of the electrode, preferably less than or equal to 20% by weight, especially less than or equal to 10% by weight, and more particularly less than or equal to 5% by weight, relative to the total weight of the electrode.

In particular, an electrode according to the invention may comprise less than 10% by weight of fluorinated binders, in particular less than 5% by weight of fluorinated binders, relative to the total weight of the electrode.

Preferably, an electrode according to the invention is free of binder.

An electrode may additionally comprise other additives commonly used for electrodes of secondary lithium batteries.

Electrode Preparation Process

An electrode according to the invention may be prepared according to various techniques.

According to a first embodiment variant, the electrode according to the invention may be formed by a process for preparing an electrode as defined above, comprising at least the steps consisting of:

(i) providing a mixture formed of at least one electrode material as defined above, of a liquid phase, in particular comprising one or more organic or aqueous solvents, and optionally of one or more electron-conducting additive(s) and/or binder(s); and (ii) depositing said mixture from step (i) by coating or by a printing technique on a base substrate.

The dispersion from step (i), when it is aqueous, may also comprise a thickener, for example of carboxymethyl cellulose or hydroxypropyl methylcellulose type, and/or a surfactant and/or a salt (LiOH for example). Such a dispersion is also commonly referred to as "ink". The ink may for example be deposited according to step (ii) on a current collector, such as a metal foil, for example made of aluminum.

The deposition of the ink may for example be carried out by flexographic printing, photogravure, screenprinting, inkjet printing or spraying. A person skilled in the art is capable of adjusting the processing conditions of these various techniques.

According to one particular embodiment, the base substrate may be a polymer film of polyethylene or polypropylene type, the step (ii) of depositing the ink then being followed by a subsequent step (iii) of detaching said polymer film, in order to form a self-supported electrode.

According to a second embodiment variant, the electrode may be formed by in situ electropolymerization in solution. A layer formed of polymers according to the invention may be more particularly formed by electropolymerization of the functionalized monomers directly on a current collector, such as for example an aluminum, nickel, copper, steel or carbon foil, where appropriate in the presence of additional electron conductors.

The invention thus relates, according to another of its aspects, to a process for preparing an electrode as defined above, comprising the formation of said polymer by in situ electropolymerization on a current collector of monomers bearing at least one group possessing at least one nitroxide function, said monomers being selected from the family of fluorenes, carbazoles, anilines, phenylenes, isothionaphthenes, acetylenes and phenylene vinylenes and mixtures thereof.

According to one particularly preferred variant, the electropolymerization takes place directly within an electrochemical lithium cell. In this configuration, the electropolymerization takes place during the first charging (or discharging) cycle of the cell and the electrode is formed in situ on the collector of the positive (or negative respectively) electrode.

More particularly, the process for forming the electrode by in situ electropolymerization may comprise at least the steps consisting of:

(iv) putting said functionalized monomers into solution in an electrolyte solution of a electrochemical lithium cell; and (v) performing at least one charging cycle of the cell in order to form a positive electrode, or at least one discharging cycle of the cell in order to form a negative electrode.

The electrolyte solution may be selected from the electrolytes conventionally used for lithium batteries, through which Li$^+$ cations have the chance to migrate. The electrolyte may, for example, consist of a salt comprising at least the Li$^+$ cation. The salt is, for example, selected from LiClO$_4$, LiAsF$_6$, LiPF$_4$, LiBF$_4$, LiR$_F$SO$_3$, LiCH$_3$SO$_3$, LiN(R$_F$SO$_2$)$_2$ and LiN(R$_F$SO$_2$)$_3$; R$_F$ being selected from a fluorine atom and a perfluoroalkyl group comprising between one and eight carbon atoms. The salt is, preferably, dissolved in an aprotic polar solvent such as ethylene carbonate, propylene carbonate, dimethyl carbonate or ethyl methyl carbonate; and it may be supported by a separator element placed between the first and second electrodes, the separator element then being soaked in electrolyte.

Other methods of forming an electrode according to the invention can also be envisaged, especially:

by processing the polymers of the invention in solution: solubilization of the active material according to the invention in a solvent, optionally in the presence of additional electron conductors, and deposition of the solution via a conventional technique, for example selected from printing techniques (flexographic printing, photogravure, screenprinting, inkjet printing, spraying, etc.), drop casting, dip coating and spin coating. Processing in solution facilitates the deposition on flexible collectors of polymer type with a metallic or carbon fabric deposit; or else by processing the polymers of the invention in the melt state: injection molding, extrusion, rotomolding, for example, optionally in the presence of additional electron conductors. In the case of extrusion, the extrudate will be in the form of a rod, which will be applied to the current collector by compression (isostatic press, calendering, etc.) or preferably in the form of a film which will be deposited in the melt state directly on an electrically conductive collector (Al, Ni, Cu, steel, carbon, etc.).

Secondary Lithium Battery

As mentioned previously, an electrode formed from the electrode material according to the invention proves particularly advantageous regarding the use thereof in secondary lithium batteries.

Thus, the present invention relates to a secondary lithium battery, comprising an electrode according to the invention.

It may be a lithium-ion, lithium-polymer, lithium-sulfur, lithium-air or supercapacitor battery.

According to one particular embodiment, an electrode according to the invention is used in a lithium-ion battery.

The remainder of the battery may be formed according to conventional methods. Generally, lithium-ion batteries have an architecture with two electrodes (a positive electrode and a negative electrode), both coated onto an electrically conductive current collector, positioned on either side of an organic or inorganic separator. The two techniques for assembling this architecture that are currently most commonly used are coiling (winding the various constituents in a cylindrical or prismatic geometry) and stacking (layer by layer stacking of the various elements). Of course, other assembly techniques for forming a battery can be envisaged, such as printing techniques.

The electrode according to the invention may form the positive electrode or negative electrode of the battery. Preferably, it will form the positive electrode.

The invention will now be described by means of the following examples and figures.

These examples and these figures are of course given by way of illustration and with no limitation of the invention.

FIGURES

Figure 2:
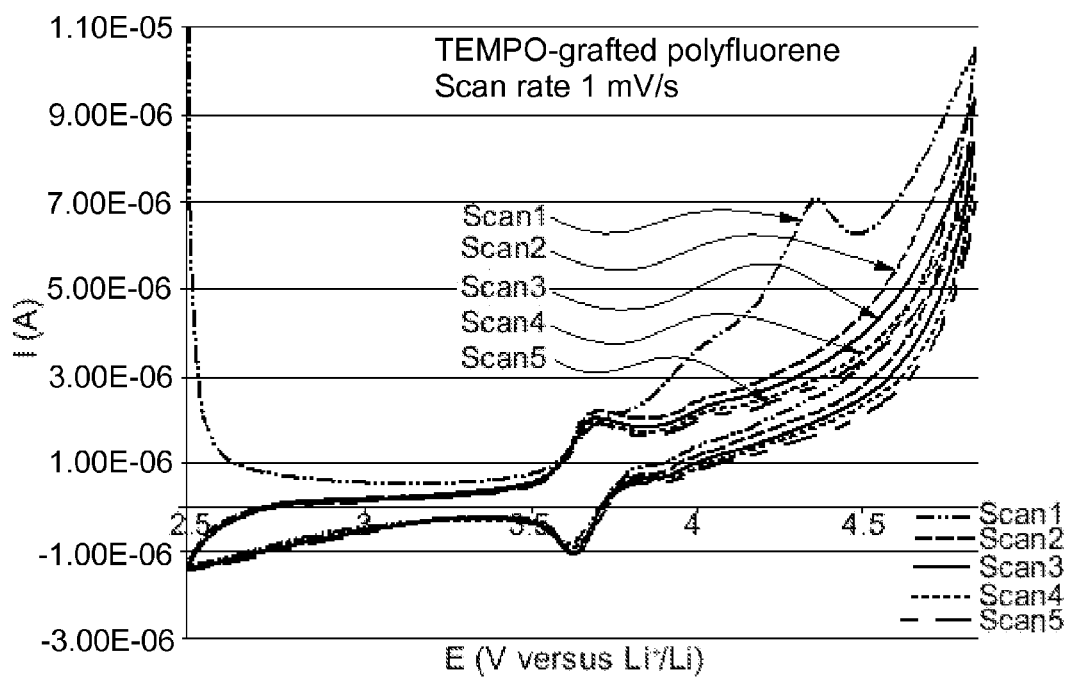

FIG. 1: Infrared spectrum of TEMPO-mesylate (formed according to example 1.c.), of polyfluorene and of TEMPO-grafted polyflurorene formed according to example 3;

FIG. 2: Cyclic voltammogram of the TEMPO-grafted polyflurorene.

EXAMPLES

In all of the examples that follow, the term "TEMPO" is used to denote a group:

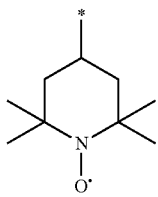

Example 1

Preparation of TEMPO Functionalized by a Leaving Group

Example 1.a.: Chlorination of TEMPO

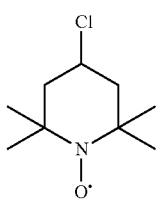

Hydroxy-TEMPO is introduced into a round-bottomed flask under an argon atmosphere and dissolved in dichloromethane. 1 equivalent of base (triethylamine) then of thionyl chloride are introduced dropwise. This mixture is stirred at 45° C. for 24 hours. Next, the solution is washed with water and then with brine and finally dried over magnesium sulfate. After filtration, the solvent is evaporated under vacuum.

Example 1.b.: Bromination of TEMPO

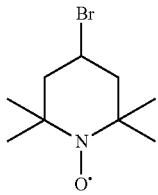

Hydroxy-TEMPO is introduced into a round-bottomed flask under an argon atmosphere and dissolved in chloroform. 1 equivalent of PBr$_3$ is introduced dropwise. This mixture is stirred at 65° C. for 24 hours. Next, the solution is washed with water and then with brine and finally dried over magnesium sulfate. After filtration, the solvent is evaporated under vacuum.

Example 1.c.: Functionalization of TEMPO by a Mesylate or Tosylate Group

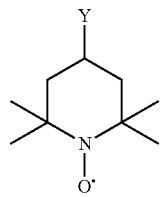

Y = —OSO$_2$CH$_3$, —OSO$_2$C$_6$H$_5$CH$_3$,

Hydroxy-TEMPO is introduced into a round-bottomed flask under an argon atmosphere and dissolved in dichloromethane. 1.1 equivalents of base (triethylamine) are added to the reaction medium at 0° C. then 1 equivalent of methanesulfonyl chloride or toluenesulfonyl chloride is added dropwise. This mixture is stirred at 25° C. for 24 hours. Next, the solution is washed with water, with an aqueous solution of sodium hydrogencarbonate and finally with brine, and then dried over magnesium sulfate. After filtration, the solvent is evaporated under vacuum.

The infrared spectrum of the TEMPO-mesylate obtained is represented in FIG. 1.

Example 2

Preparation of Fluorene Monomers Functionalized by TEMPO

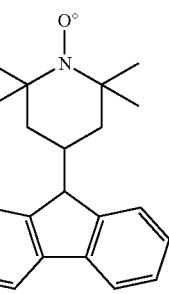

Fluorene or 2,7-dibromofluorene is introduced into a round-bottomed flask under an argon atmosphere and dissolved in THF. 4 equivalents of base (K$_2$CO$_3$ or NaH) are introduced. 1 equivalent of functionalized TEMPO (TEMPO mesylate or halo-TEMPO) is then dissolved in the THF and then this solution is added dropwise to the reaction medium. The mixture is introduced into water, extracted with ether, then dried over magnesium sulfate. The product is then dried under vacuum.

Example 3

Polymerization of the Fluorene Monomers, Optionally Previously Functionalized by TEMPO Grafts

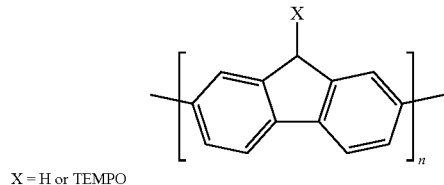

X = H or TEMPO

Fluorene or TEMPO-grafted fluorene is introduced into a round-bottomed flask under an argon atmosphere and dissolved in chloroform. Iron (III) chloride (5 equivalents) in solution in nitromethane is then added dropwise to the reaction medium at −78° C. This mixture is stirred at 25° C. for 70 hours and then is introduced dropwise into methanol with vigorous stirring. Hydrazine (10 equivalents) and ethylene diaminetetraacetic acid (10 equivalents) are added to the solution and the reaction mixture is stirred for 24 hours. Next, the suspension is filtered and then washed with water and methanol. Next, a Soxhlet extraction is carried out with acetone and then the product is dissolved in 100 ml of chloroform and dried over magnesium sulfate. The solvent is then evaporated under vacuum.

The infrared spectra of polyfluorene and of TEMPO-grafted polyfluorene are represented in FIG. 1.

Example 4

Polymerization of the Dibromofluorene Monomers, Optionally Previously Functionalized by TEMPO Grafts

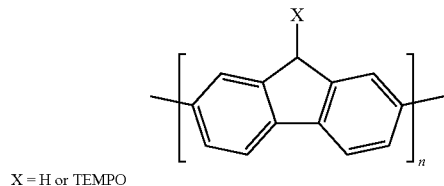

X = H or TEMPO 2,7-dibromofluorene or TEMPO-grafted 2,7-dibromofluorene is introduced into a round-bottomed flask under an argon atmosphere and dissolved in DMF. Zinc powder (4 equivalents) and also Ni(COD)$_2$ (10 mol %) are then added to the reaction medium at −78° C. This mixture is stirred at 25° C. for 70 hours and then is filtered and washed with methanol in the presence of ethylenediaminetetraacetic acid (10 equivalents). Next, the suspension is filtered then washed with methanol, with hydrochloric acid and finally with water. The powder obtained is dissolved in chloroform, dried over magnesium sulfate then precipitated into methanol, filtered and dried under vacuum.

Example 5

Grafting of TEMPO to Polyfluorene

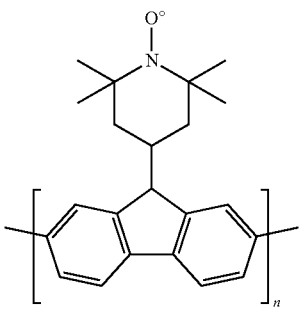

Polyfluorene is introduced into a round-bottomed flask under an argon atmosphere and dissolved in THF. Sodium hydride (4 equivalents) is then added and this mixture is stirred at 25° C. for 2 hours. Next, 1 equivalent of functionalized TEMPO (TEMPO mesylate or halo-TEMPO) is dissolved in THF then this solution is added dropwise to the reaction medium and stirred for 24 hours. The mixture is introduced into water, extracted with ether and washed with brine and then dried over magnesium sulfate. The product is then dried under vacuum and reprecipitated into methanol.

Example 6

Cyclic Voltammogram of TEMPO-Grafted Polyfluorene

In a glove box under an argon atmosphere, the TEMPO-grafted polyfluorene is introduced into 2 ml of a 1 mol/l solution of lithium hexafluorophosphate in a mixture of ethylene carbonate, propylene carbonate and dimethyl carbonate in a 1/1/3 volume proportion. 5 scans are carried out at a rate of 1 mV/s between 2.5 and 4.7 V.

Example 7

Use of TEMPO-Grafted Polyfluorene

In order to determine the electrochemical performances of the electrode material according to the invention, a lithium-metal storage battery of "button cell" type is produced with:
- a lithium negative electrode in the form of a disk having a diameter of 16 mm and a thickness of 130 μm and that is deposited on a stainless steel disk serving as current collector;
- a positive electrode consisting of a disk having a diameter of 14 mm taken from a composite film having a thickness of 50 μm comprising the composite material of the invention prepared according to example 1 deposited on a current collector made of aluminum (foil having a thickness of 20 micrometers); and
- a separator soaked in a liquid electrolyte based on LiPF$_6$ salt (1 mol/l) in solution in a mixture of propylene carbonate and dimethyl carbonate.

At 20° C., under a C/10 rate (rate of charging and discharging over 10 hours), this system makes it possible to extract most of the lithium present in the positive electrode material.

The invention claimed is:

1. A polymer possessing a linear backbone selected from the polymers belonging to the family of polyfluorenes, polycarbazoles, polyanilines, polyphenylenes, polyisothionaphthenes, polyacetylenes, and combinations thereof, said backbone bearing at least one side group possessing at least one nitroxide function in NO. radical form, wherein the polymer has the structure (I) below:

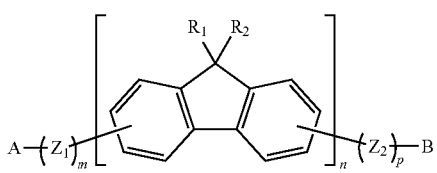
(I)

wherein:
A and B represent, independently of one another, a hydrogen atom, a halogen atom, an acetylenic function, a boronic acid or borane function, a stannic function, a zincic group or a magnesian group;
—$(Z_1)_m$— and —$(Z_2)_p$— represent the sequence of one or more monomers selected from carbazole, aniline, phenylene, isothionaphthene, acetylene and phenylene vinylene monomers; —$(Z_1)_m$— being at position 5, 6, 7 or 8 of the fluorene, —$(Z_2)_p$— being at position 1, 2, 3 or 4 of the fluorene;
at least one of $R_1$ and $R_2$ represents *—Y(G)$_t$, with:
* representing a covalent bond with the fluorene;
t being equal to 1 or 2;
if t is equal to 1, Y represents a covalent bond; a linear or branched, saturated or unsaturated ($C_1$-$C_5$)alkyl group, optionally interrupted by one or more heteroatom(s) or by one or more ether, ester or amide functions; —O—; —COO— or —CONH;
if t is equal to 2, Y represents a linear or branched, saturated or unsaturated ($C_1$-$C_5$)alkyl group, optionally interrupted by one or more heteroatom(s) or by one or more ether, ester or amide functions; —O—; —COO— or —CONH;
G representing a group possessing at least one nitroxide function in NO. radical form;
the other one of $R_1$ and $R_2$ represents *—Y(G)$_t$, which may be identical or different, or a hydrogen atom;
m and p represent integers ranging from 0 to 50000; and
n represents an integer ranging from 1 to 50000, on condition that when n=1, at least one of m and p is other than 0.

2. The polymer as claimed in claim 1, said polymer being crosslinked.

3. The polymer as claimed in claim 1, wherein said side group(s) bearing at least one nitroxide function has (have) one of the following structures:

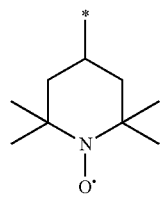
(G1)

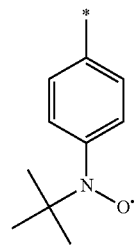
(G2)

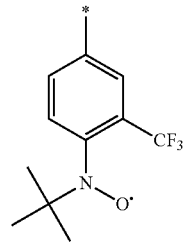
(G3)

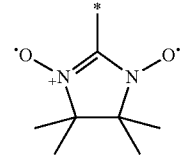
(G4)

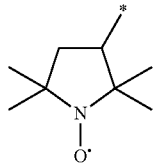
(G5)

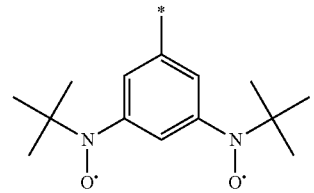
(G6)

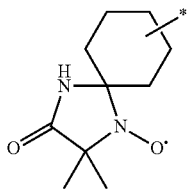
(G7)

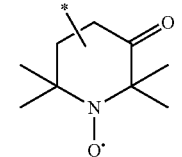
(G8)

with * depicting the location of the site of bonding to said linear backbone.

4. The polymer as claimed in claim 1, wherein at least one portion of said side groups possess at least two nitroxide functions in NO. radical form.

5. The polymer as claimed in claim 1, wherein at least one portion of said side groups has the structure 2,2,6,6-tetramethylpiperidinyl-N-oxy.

6. The polymer as claimed in claim 1, possessing a linear backbone formed completely or partly from a polyfluorene.

7. The polymer as claimed in claim 1, having the structure (I) wherein A and B represent, independently of one another, a hydrogen atom or a halogen atom; $R_1$ represents a *—Y (G)$_t$ group with t equal to 1, Y representing a covalent bond, and G being selected from the structures (G1) to (G8):

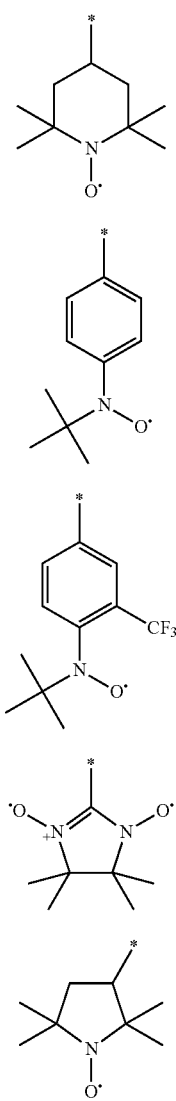

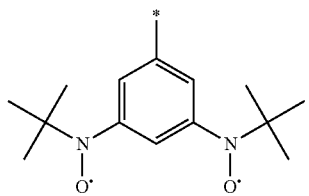

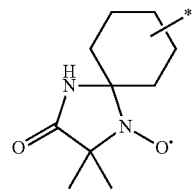

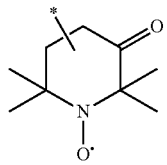

with * depicting the location of the site of bonding to said linear backbone; $R_2$ represents H; m and p are equal to 0 and n is an integer ranging from 2 to 50000.

8. The polymer as claimed in claim 7, wherein G represents structure (G1).

9. The polymer as claimed in claim 7, wherein A and B represent, independently of one another, a hydrogen atom or a bromine atom.

10. The polymer as claimed in claim 7, said polymer having a number-average degree of polymerization ranging from 5 to 5000.

11. The polymer as claimed in claim 1, said polymer having a molar degree of grafting of nitroxide functions in NO. radical form ranging from 1% to 800%.

12. The polymer as claimed in claim 1, said polymer having a molar degree of grafting of nitroxide functions in NO. radical form ranging from 50% to 200%.

13. The polymer as claimed in claim 4, wherein all of said side groups possess at least two nitroxide functions in NO. radical form.

14. The polymer as claimed in claim 5, wherein all of said side groups has the structure 2,2,6,6-tetramethylpiperidinyl-N-oxy.

15. The polymer as claimed in claim 10, said polymer having a number-average degree of polymerization ranging from 10 to 100.

* * * * *

UNITED STATES PATENT AND TRADEMARK OFFICE
CERTIFICATE OF CORRECTION

PATENT NO. : 9,640,797 B2
APPLICATION NO. : 14/394963
DATED : May 2, 2017
INVENTOR(S) : Thibault Gutel et al.

It is certified that error appears in the above-identified patent and that said Letters Patent is hereby corrected as shown below:

In the Claims

Claim 1, Column 17, Line 7:
Delete "NO." and replace with -- NO• --.

Claim 1, Column 17, Line 45:
Delete "NO." and replace with -- NO• --.

Claim 4, Column 18, Line 64:
Delete "NO." and replace with -- NO• --.

Claim 11, Column 20, Line 39:
Delete "NO." and replace with -- NO• --.

Claim 12, Column 20, Line 42:
Delete "NO." and replace with -- NO• --.

Claim 13, Column 20, Line 44:
Delete "NO." and replace with -- NO• --.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*